US 11,658,315 B2

(12) United States Patent
Bang et al.

(10) Patent No.: US 11,658,315 B2
(45) Date of Patent: May 23, 2023

(54) FUEL CELL SYSTEM WITH A MULTI-STREAM HEAT EXCHANGER AND ITS METHOD OF OPERATION

(71) Applicant: BLUE WORLD TECHNOLOGIES HOLDING APS, Aalborg Ost (DK)

(72) Inventors: Mads Bang, Stovring (DK); Peter Leander Jensen, Svenstrup (DK); Deni Maric, Aalborg (DK); Fan Zhou, Klarup (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 0 days.

(21) Appl. No.: 17/769,644

(22) PCT Filed: Oct. 8, 2020

(86) PCT No.: PCT/DK2020/050274
§ 371 (c)(1),
(2) Date: Apr. 15, 2022

(87) PCT Pub. No.: WO2021/073702
PCT Pub. Date: Apr. 22, 2021

(65) Prior Publication Data
US 2022/0407093 A1   Dec. 22, 2022

(30) Foreign Application Priority Data
Oct. 17, 2019   (DK) .......................... PA 2019 70649

(51) Int. Cl.
*H01M 8/04007*   (2016.01)
*H01M 8/04029*   (2016.01)
(Continued)

(52) U.S. Cl.
CPC ...... *H01M 8/04074* (2013.01); *F28D 7/0091* (2013.01); *H01M 8/04029* (2013.01);
(Continued)

(58) Field of Classification Search
CPC ......... H01M 8/04029; H01M 8/04074; H01M 8/04119; H01M 8/04164; H01M 8/04268;
(Continued)

(56) References Cited

U.S. PATENT DOCUMENTS

| 6,120,923 A | 9/2000 | Van Dine et al. |
| 8,771,884 B1 * | 7/2014 | Cacioppo .......... H01M 8/04134 |
| | | 429/414 |
| 2001/0019788 A1 | 9/2001 | Boneberg et al. |
| 2002/0028364 A1 | 3/2002 | Kaufmann |

(Continued)

FOREIGN PATENT DOCUMENTS

| JP | H11307112 A | 11/1999 |
| JP | 2010238416 A | 10/2010 |

(Continued)

OTHER PUBLICATIONS

International Search report for PCT/DK2020/050274, prepared by the Nordic Patent Institute, dated Dec. 21, 2020, 8 pages.

*Primary Examiner* — Brian R Ohara
*Assistant Examiner* — Brent C Thomas
(74) *Attorney, Agent, or Firm* — Brooks Kushman P.C.; John Nemazi (57) ABSTRACT

In a fuel cell system, for example HTPEM fuel cells, especially for automobiles, a multi-stream heat exchange unit is employed in order to save space.

16 Claims, 6 Drawing Sheets

(51) Int. Cl.
*H01M 8/04119* (2016.01)
*H01M 8/0612* (2016.01)
*H01M 8/04223* (2016.01)
*H01M 8/04225* (2016.01)
*F28D 7/00* (2006.01)
*H01M 8/10* (2016.01)

(52) U.S. Cl.
CPC ... *H01M 8/04164* (2013.01); *H01M 8/04225* (2016.02); *H01M 8/04268* (2013.01); *H01M 8/0618* (2013.01); *H01M 2008/1095* (2013.01)

(58) Field of Classification Search
CPC ................ F28D 7/0083; F28D 7/0091; F28D 2021/0043
See application file for complete search history.

(56) References Cited

U.S. PATENT DOCUMENTS

| | | |
|---|---|---|
| 2007/0037027 A1 | 2/2007 | Oma |
| 2010/0104903 A1 | 4/2010 | Gummalla |
| 2014/0262168 A1 | 9/2014 | George, II et al. |
| 2015/0340715 A1 | 11/2015 | Chang et al. |
| 2015/0380756 A1 | 12/2015 | Orishima et al. |
| 2017/0331132 A1 | 11/2017 | Matian et al. |
| 2020/0161675 A1 | 5/2020 | Lawlor et al. |

FOREIGN PATENT DOCUMENTS

| | | |
|---|---|---|
| KR | 20170087077 A | 7/2017 |
| WO | 2009063283 | 5/2009 |
| WO | 2017148487 A1 | 9/2017 |
| WO | 2019158173 A1 | 8/2019 |

\* cited by examiner

FUEL CELL SYSTEM WITH A MULTI-STREAM HEAT EXCHANGER AND ITS METHOD OF OPERATION

CROSS-REFERENCE TO RELATED APPLICATION

This application is the U.S. national phase of PCT Application No. PCT/DK2020/050274 filed on Oct. 8, 2020, which claims priority to DK Patent Application No. PA 2019 70649 filed on Oct. 17, 2019, the disclosures of which are incorporated in their entirety by reference herein.

FIELD OF THE INVENTION

The present invention relates to fuel cell systems, for example HT-PEM fuel cells, with a burner and a reformer and a heat exchange system and its use for a vehicle as well as methods of operating such fuel cell system.

BACKGROUND OF THE INVENTION

When generating electricity with fuel cell systems, also heat is generated as a byproduct, which is removed by cooling-liquid that is circulating through channels in the fuel cell. The temperature is adjusted by flow of cooling-liquid, for example based on glycol, through heat exchangers and radiators for optimized function of the fuel cell. On the other hand, the coolant can be used for heating the fuel cells during startup conditions.

Three way heat exchangers are known in general for coolant circuits. An example for three cooling circuits through a single three way heat exchanger is disclosed in Korean patent application KR2017-0087077. However, three way heat exchangers have not yet been proposed for heat exchange between liquid and gases for providing compact solutions for fuel cell systems, especially in automobiles. Instead, two-way cross flow heat exchangers are typically used for fuel cell systems as heat exchangers for air or as condensers.

WO 2019/158173 A1 describes a fuel cell system comprising a stack of fuel cells, each including a cathode, an anode and a polymer electrolyte, and a cooling fluid circuit. The fuel cell system further comprises a cathode gas supply feeding cathode gas to the cathodes, and a reformer receiving evaporated fuel and converting it to syngas which is fed to the anode side of the fuel cells. The fuel cell system also comprises a reformer burner heating the reformer, an evaporator receiving liquid fuel and evaporating it to form evaporated fuel which is fed to the reformer. The evaporator is heated by the cooling liquid of the cooling circuit.

WO2017/148487 discloses a fuel cell system with a cooling circuit in which the coolant is split into a major portion that passes through a heat exchanger for evaporating fuel and a minor portion that passes through a heat exchanger for cooling of the coolant. US2015/0340715 discloses a fuel cell system in which the coolant is used for heating and humidifying air and hydrogen before the air and hydrogen enter the fuel cell module. US2001/0019788 discloses a cooling circuit where coolant is used for evaporating fuel.

For fuel cell systems, especially in the automobile industry, there is a steady demand for optimization. In particular, there is a demand for minimization of space and weight. This above-mentioned prior art does not teach a cathode gas heater that is heated by the cooling circuit fluid, and that the cathode gas heater and the evaporator are combined in one three-way heat exchanger module.

DESCRIPTION/SUMMARY OF THE INVENTION

It is an objective of the invention to provide an improvement in the art. In particular, it is an objective to provide a fuel cell system that is compact and useful for being provided in little space, for example in automobiles. This objective and further objectives are achieved with a fuel cell system and method as described in the following and in the claims.

As set forth in the following, different principles are presented for achieving compactness, while optimizing the thermal efficiency.

The fuel cell system comprises a fuel cell, typically a fuel cell stack. Herein, the term fuel cell is used for a single fuel cell as well as for multiple fuel cells, for example a fuel cell stack.

The fuel cell comprises an anode side and a cathode side and a proton exchange membrane therein between for transport of hydrogen ions from the anode side to the cathode side through the membrane during operation.

For example, the fuel cell is of the type that operates at a high temperature. The term "high temperature" is a commonly used and understood term in the technical field of fuel cells and refers to operation temperatures above 120° C. in contrast to low temperature fuel cells operating at lower temperatures, for example at 70° C. For example, the fuel cell operates in the temperature range of 120-200° C.

For example, the fuel cell in the fuel cell system is a high temperature polymer electrolyte membrane fuel cell, (HT-PEM), which operates above 120 degrees centigrade, differentiating HT-PEM fuel cell from low temperature PEM fuel cells, the latter operating at temperatures below 100 degrees, for example at 70 degrees. The normal operating temperature of HT-PEM fuel cells is the range of 120 to 200 degrees centigrade, for example in the range of 160 to 170 degrees centigrade. The polymer electrolyte membrane PEM in the HT-PEM fuel cell is mineral acid based, typically a polymer film, for example polybenzimidazole doped with phosphoric acid. HT-PEM fuel cells are advantageous in being tolerant to relatively high CO concentration and are therefore not requiring PrOx reactors between the reformer and the fuel cell stack, why simple, lightweight and inexpensive reformers can be used, which minimizes the overall size and weight of the system in line with the purpose of providing compact fuel cell systems, for example for automobile industry.

The fuel cell is used to create electricity, for example for driving a vehicle, such as an automobile. In order to provide a buffer for the produced electricity, typically a battery system is provided in electrical connection with the fuel cell.

For example, air is used to provide oxygen to the fuel cell. In this case, an air supply is provided for supplying air to the cathode side. Prior to entering the fuel cell, the air is heated by an air heating system for increasing the temperature of the air. The air provides the oxygen for the fuel cell. Other gases of the air merely flow through the system and are discarded again.

As an alternative to air, in principle, another gas that contains oxygen gas or even pure oxygen gas could be used. For simplicity, the gas that contains oxygen is herein called cathode gas, be it pure oxygen gas, air, or other gas blends that contain oxygen, which is provided to the cathode side of the fuel cell. Correspondingly, the gas heating system is generally called a cathode gas heating system.

A first cooling circuit is provided for recirculating first coolant through the fuel cell for adjusting the temperature of the fuel cell with the first coolant. During normal operation, the first cooling circuit is taking up heat from the fuel cell in order to keep the temperature stable and in an optimized range. For example, the temperature of the fuel cell is 170 degrees, and the first coolant has a temperature of 160 degrees at the entrance of the fuel cell.

For example the first coolant is glycol based. However, in case that the fuel cell system is used for automobiles in cold areas, glycol is not optimum for the start-up, why other liquids are preferred. Examples of such other liquids include synthetic oils.

A reformer with a catalyser is used for catalytic conversion of fuel into syngas, which contains the necessary hydrogen gas for the anode side of the fuel cell, which is used in the fuel cell for production of electricity. Accordingly, the reformer is conduit-connected to the anode side of the fuel cell. The reformer comprises a catalyser inside a reformer housing, which has reformer walls.

For the catalytic reaction in the reformer, the provided liquid fuel is evaporated in an evaporator that is conduit-connected on its downstream side by a fuel vapor conduit to the reformer. The upstream side of the evaporator is conduit-connected to a liquid fuel supply for receiving fuel, for example a mix of liquid methanol and water.

For heating the reformer to the proper catalytic conversion temperature, for example in the range of 250-300 degrees, a reformer burner is provided and in thermal contact with the reformer for transfer of heat to the catalyser inside the reformer. The reformer burner comprises a burner-chamber providing flue gas by burning anode waste gas or fuel or both. For example, the reformer burner provides flue gas at a temperature in the range of 350-400 degrees, is provided from a reformer burner.

For example, in normal operation, the flue gas from the reformer burner is passing along the reformer walls and heats them. In such embodiment, the burner-chamber is in fluid-flow communication with the reformer walls for flow of the flue gas from the burner-chamber to and along the reformer walls for transfer of heat from the flue gas to the reformer walls.

After the transfer of the thermal energy from the flue gas to the reformer walls, remaining thermal energy can be used for heating other components, for example batteries that are used to store the electrical energy of the fuel cell, or for heating a vehicle cabin. The reformer burner is configured for providing flue gas by burning anode waste gas or fuel or both.

For example, the reformer and reformer burner are provided as a compact unit. Optionally, in order to provide one way of a compact burner/reformer unit, the reformer walls are tubular and surround the burner walls. However, this is not strictly necessary, and a serial configuration, or a side-by-side configuration of the burner/reformer or a configuration of a burner sandwiched between two sections of the reformer is also possible.

For compactness, advantageously, the cathode gas heating system and the evaporator are combined in a single compact first heat exchange unit comprising a first housing and which is configured for transfer of thermal energy from the first coolant inside the first housing to both the cathode gas and the fuel, so that both the cathode gas and the fuel receive thermal energy from the first coolant.

In this case, a first stream exchanges heat with to other streams, for example counter-flowing streams. More than three streams are available for the first and further heat exchange units.

For example, the first heat exchange unit comprises two heat exchange modules which receive the first coolant serially or in parallel. The latter principle yields a higher efficiency, allowing a more compact technical solution.

Different principles are possible for the multi-stream heat exchange unit. For example, the coolant is diverted into two or more heat exchange areas or heat exchange modules. This implies that a first part of the coolant is flowing into one of the heat exchange areas or modules and only, or at least predominantly, exchanging energy with fluid in that heat exchange area or module, while a second part of the coolant is flowing into another of the heat exchange areas or modules and only, or at least predominantly, exchanging energy with fluid in that other heat exchange area or module. Alternatively, the multi-stream heat exchange unit is of the type in which the coolant flows in a space that is sandwiched between multiple heat exchange modules. The heat is in this case transferred from the first coolant in between the modules to the fluids in the respective module. For example, the multi-stream heat exchange unit has a three-layer configuration.

In some practical embodiments of the first heat exchange unit, the cathode gas heating system is provided as a first heat exchange module, and the evaporator is provided as a second heat exchange module, and there is provided a space inside the housing, the space being sandwiched between the first and the second heat exchange module.

Optionally, it is configured for flow of the first coolant in the space for transferring heat from the first coolant to both the first and the second heat exchange module simultaneously on either side of the space.

As options, bent configurations, for example cylindrical configurations, are possible, but also unbent configurations. Optionally the first and the second heat exchange module are provided in parallel with respect to each other with the space for the flow of the coolant in between.

In other practical embodiments, the first heat exchange unit is configured for diverting at least a part of the first coolant that flows into the first housing into a first portion of the first coolant for only or predominantly exchanging energy with the cathode gas and a second portion of the first coolant for only or predominantly exchanging energy with the fuel.

Optionally, the first heat exchange unit comprises a first and a second heat exchange module, wherein the first heat exchange module is configured for receiving only the first portion of the first coolant, and the second heat exchange module is configured for receiving only the second portion of the first coolant.

In some practical embodiments, the first and the second heat exchange module are provided with a distance in between for minimizing thermal conduction from the first to the second heat exchange module.

In practical embodiments, there are provided at least three flow paths in the first heat exchange unit, the three flow paths comprising a first flow path, a second and a third flow path through the first heat exchange unit. The first flow path is for the first coolant and is part of the first cooling circuit. The second flow path is for the cathode gas and constitutes the cathode gas heating system. The third flow path is for flow of the fuel and constitutes the evaporator for the fuel.

However, this results in a complex heat exchange principle, where the heat exchange with the cathode gas influences the heat exchange with the fuel. Therefore, as an alternative for a configuration that is simpler to control, the first heat exchange unit comprises two heat exchange modules with the second and third flow path, respectively, each of which is connected to the first flow path for thermal exchange to the first coolant. However, also in this case, all heat exchange modules for the heat exchange between the first coolant and the cathode gas as well as the fuel are provided in the same first heat exchange unit and include exchange heat with the first coolant inside the first housing.

In a practical embodiment, the first heat exchange unit has a first inlet for inflow of the first coolant into the first housing and a first outlet for outflow of the first coolant from the first housing. Between the first inlet end the first outlet, there is provided the first flow path inside the first housing for the first coolant, the first flow path connecting the first inlet with the first outlet.

Additionally, the first heat exchange unit and has a second inlet and second outlet for the second flow path, which is for the cathode gas, and the second flow path constitutes the cathode gas heating system. The first heat exchange unit has a third inlet and a third outlet for a third flow path, which is for flow of the fuel. The third flow path constitutes the evaporator for the fuel. Optionally, further flow paths are provided.

In particular embodiments, the first inlet is conduit-connected to the coolant downstream side of the fuel cell for receiving coolant from the fuel cell after the coolant has traversed the fuel cell. The second inlet is conduit-connected to the cathode gas supply, for example air supply, for receiving oxygen gas for the cathode side of the fuel cell. The second outlet is pipe connected to the cathode side of the fuel cell for providing heated oxygen gas to the fuel cell. The third inlet is conduit-connected to the fuel supply for receiving fuel, for example a methanol/water mix. The third outlet is connected to the anode side of the fuel cell for supplying evaporated fuel to the anode side of the fuel cell.

For example, the first flow path is in thermal connection with the second and the third flow path for simultaneous transfer of thermal energy inside the first heat exchange unit from the first coolant to the cathode gas and from the first coolant to the fuel for heating the fuel and cathode gas during their flow through the first heat exchange unit when the fuel cell system is in operation.

The flow paths are separated from each other by thermally conducting walls, typically metal walls.

When the fuel cell system is in power producing operation, a flow of the first coolant is provided through the first flow path, a flow of the cathode gas through the second flow path, and a flow of the fuel through the third flow path. Simultaneous transfer of thermal energy is achieved from the first coolant to the cathode gas for heating the cathode gas and from the first coolant to the fuel for evaporating the fuel.

In particular it is emphasized that the transfer of heat to the second and third flow path is advantageously not provided in two serially connected heat exchange modules because it is a disadvantage efficacy-wise in that the coolant would change temperature when flowing through a first heat exchange unit before reaching the second, which reduces efficacy. For higher efficacy, the principle is rather a parallel principle of simultaneous heat exchange from one medium to two others, although the flow itself need not be in parallel motion.

In some practical embodiments, a least a part of the inflow of first coolant through the first inlet into the first flow path is diverted into a first and a second portion, where the first portion of the first coolant is only or predominantly exchanging energy with the cathode gas in the second flow path, and the second portion of the first coolant is only or predominantly exchanging energy with the fuel in the third flow path. Optionally, the first and second portion of the first coolant are combined again prior to flowing out of the first outlet of the first heat exchange unit.

The principle of a multiple stream heat exchanger, for example three way heat exchanger, is also applicable for a different function as explained in the following. This principles can be used alternatively to the first heat exchanger or additionally.

Optionally, a second multi-stream heat exchange unit is provided as a second single unit with a second housing and comprising at least three flow paths, the three flow paths comprising a fourth, a fifth and a sixth flow path through the second heat exchange unit. The fourth flow path is for a second coolant different from the first coolant and part of a second cooling circuit, which is different and flow-separated from the first cooling circuit. The fifth flow path is for the first coolant and part of the first cooling circuit. The sixth flow path is for at least one of:

a) the exhaust gas from the cathode side and
b) the flue gas from the reformer burner.

Typically, the sixth flow path is used for both a and b, and the corresponding gases are combined upstream of the sixth flow path. The fourth flow path is in thermal connection with the fifth and the sixth flow path for simultaneous transfer of thermal energy from the first coolant to the second coolant for reducing the temperature of the first coolant, and from the exhaust gas to the second coolant for condensing the water of the exhaust gas in the sixth flow path prior to leaving the fuel cell system through an exhaust.

In a practical embodiment, the second heat exchange unit has a fourth inlet for inflow of the second coolant and a fourth outlet for outflow of the second coolant. Between the fourth inlet end the fourth outlet, there is provided the fourth flow path for the second coolant, the fourth flow path connecting the fourth inlet with the fourth outlet. Similarly, the second heat exchange unit comprise a fifth inlet and fifth outlet for the fifth flow path, which is for the first coolant. The second heat exchange unit additionally has a sixth inlet and a sixth outlet for a sixth flow path, which is for flow of the exhaust gas. Optionally, further flow paths are provided.

In some practical embodiments, a least a part of the inflow of the second coolant through the fourth inlet and into the fourth flow path is diverted into a first and second portion of the second coolant, where the first portion of the second coolant is only or predominantly exchanging energy with the first coolant in the fifth flow path, and the second portion of the second coolant is only or predominantly exchanging energy with the exhaust gas in the sixth flow path. Optionally, the first and second portion of the second coolant are combined again prior to flowing out of the second heat exchange unit.

In operation, when the fuel cell system is in power producing operation, flow of the second coolant is provided through the fourth flow path and flow of the first coolant through the fifth flow path. Through the sixth flow path, there is provided flow for at least one of the exhaust gas from the cathode side and the flue gas from the reformer burner. Simultaneous transfer of thermal energy is achieved from the first coolant to the second coolant for reducing the temperature of the first coolant, and from the exhaust gas to the second coolant for condensing the water of the exhaust gas.

The fact that the heat exchange units work in a multi-stream flow principle makes adjustment of the correct temperatures more complex as compared to using two different heat exchangers. However, by using temperature gauges and flow meters controlled by a correspondingly programmed electronic controller, the flow can be readily adjusted and precisely controlled by a correspondingly programmed logical feedback control system during operation. The advantage of the multi-stream heat exchange unit is a far more complex technical solution, requiring very little space in the fuel cell system of a vehicle, such as automobile.

Optionally, the three paths in the first heat exchange unit are separated by thermal conducting metal walls, and optionally the first flow path is sandwiched between the second and the third flow path without thermal conduction from the second to the third flow path. Similarly, as an option, the three paths in the second heat exchange unit are separated by thermal conducting metal walls, and optionally the fourth flow path is sandwiched between the fifth and the sixth flow path without thermal conduction from the fifth to the sixth flow path.

For example, the first multi-stream heat exchange unit is a counter-flow heat exchanger. Similarly, as an option, the second multi-stream heat exchange unit is a counter-flow heat exchanger.

In some embodiments, the system comprises the first as well as the second heat exchange unit.

Optionally, the system further comprises a water separator that is fluid-flow connected to the sixth flow path between the second multi-stream heat exchange unit and the exhaust, and the water separator is configured for separating at least part of the condensed water from the gas flowing from the sixth flow path towards the exhaust.

In some practical embodiments, the liquid fuel supply comprises an alcohol, optionally methanol, reservoir for supplying the alcohol. Additionally, a water supply is provided for supplying water and for mixing the water with the alcohol at a mixing point upstream of the evaporator.

For example, the water supply is configured for supply of water that is recycled from the flue gas of the burner. Accordingly, as a further option, the water separator is part of a water recycling system for providing water to alcohol prior to evaporation of the mix of alcohol and water as fuel.

In some useful embodiments, the system comprises a startup heater for heating the fuel cell system during startup conditions prior to normal power producing fuel cell operation. During startup of the fuel cell system, the fuel cell has to be heated up for reaching a steady state electricity-producing state. Especially for use in vehicles, the start-up procedure should be fast. Typically, this is done in practice by transferring the heat from the flue gas to the first coolant in the first cooling cycle which during start-up is used as heating fluid, instead, in order to heat up the fuel cell to a temperature suitable for normal power producing operation.

Optionally, the first cooling circuit comprises a dedicated branch for flow of the first coolant through the startup heater in startup conditions, wherein the dedicated branch is connectable in startup conditions for flow of the first coolant from the startup heater through the fuel cell and through the first multi-stream heat exchange unit for heating the fuel cell, the cathode gas and the fuel. Optionally, the dedicated branch comprises flow of the first coolant only in startup conditions but not during steady state power producing operation of the fuel cell.

SHORT DESCRIPTION OF THE DRAWINGS

The invention will be explained in more detail with reference to the drawing, where

FIG. 4 is an illustration of an example of a multi-stream heat exchange unit, wherein

FIG. 5 is an illustration of an alternative example of a multi-stream heat exchange unit, wherein

DETAILED DESCRIPTION/PREFERRED EMBODIMENT

Figure 1:
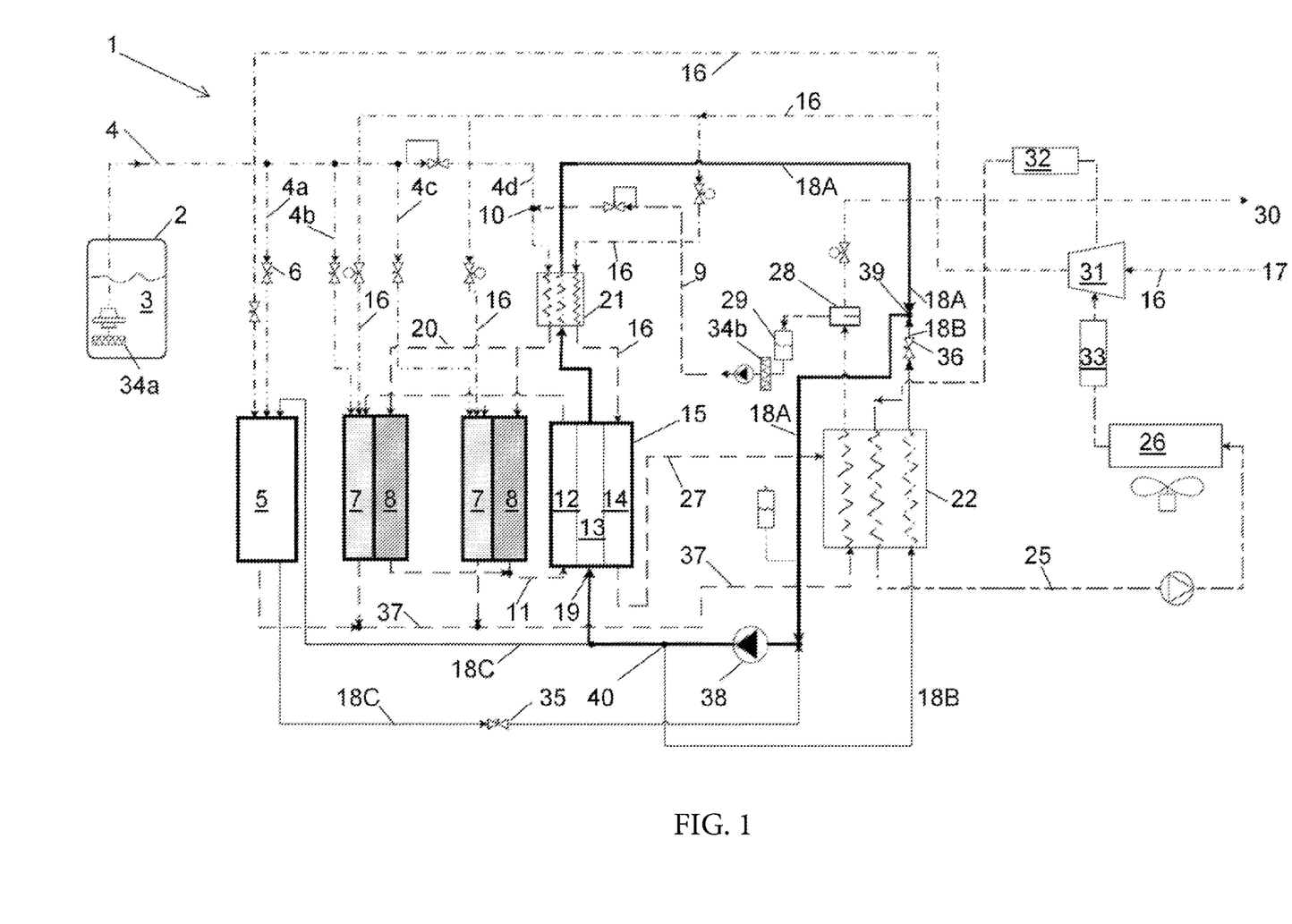
FIG. 1 illustrates a flow diagram of an example of a fuel cell system with a triple flow heat exchange unit.

FIG. 1 is a flow diagram of a fuel cell system 1 in which a first heat exchange unit 21 and a second heat exchange unit 22 are used for removing heat from the fuel cell. The two heat exchange units 21, 22 are exemplified as multi-stream heat exchange units 21, 22, for example three-way heat exchange units. However, it is also possible that only one of them is employed. A multi-stream heat exchange unit is a compact solution which is highly advantageous in automobiles, where the space is scarce.

In the left of FIG. 1, a methanol supply tank 2 is shown, which delivers methanol 3 through corresponding tubes 4, including a branch through tube 4a for supply of methanol to a startup heater 5 including a valve 6 for the start-up heater 5, branches through tubes 4b and 4c for supply of methanol for reformer burners 7, as well as a branch through tube 4d for supply of methanol as part of the fuel 20 to the reformers 8 after having been mixed with water 9 at a mixing point 10.

In the reformer 8, the mix of methanol $CH_3OH$ and water $H_2O$ is catalytically converted into hydrogen gas $H_2$ and $CO_2$. Simplified, the methanol $CH_3OH$ is converted into $2H_2$ and CO, and the water molecule splits into $H_2$ and O, where the oxygen is captures by the CO to produce $CO_2$. The mix of $H_2$ and $CO_2$ is then supplied as so-called syngas 11 to the anode side 12 of the fuel cell 15, typically fuel cell stack. Air 16 from the environment 17 is supplied to the cathode side 14 of the fuel cell 15 in order to provide the necessary oxygen for the reaction with the hydrogen to produce water, after hydrogen ions H+ have passed the membrane from the anode side 12 to the cathode side 14.

Advantageously, the fuel cell 15 is a high temperature polymer electrolyte membrane (HT-PEM) fuel cell. Typically, high temperature fuel cells operate in the temperature range of 120-200° C. For example, the fuel cell 15 operates at a temperature of 175° C. This operation temperature is held constant by a correspondingly adjusted flow of first coolant in a first cooling circuit 18 through the fuel cell 15. For example the temperature of the first coolant at the coolant inlet 19 of the fuel cell 15 is in the range of 160° C. to 170° C.

During the flow cycle of the first coolant in the first cooling circuit 18, the temperature of the first coolant has to be reduced to the temperature desired at the coolant inlet 19 of the fuel cell 15. For achieving this temperature reduction, the first coolant flows through a first heat exchange unit 21.

The first heat exchange unit 21 is exemplified as a multi-stream heat exchange unit, in particular a three way heat exchange unit, which simultaneously transfers heat between different fluids that flow through the first heat exchange unit 21. In FIG. 1, also the second heat exchange unit 22 is exemplified as a multi-stream heat exchange unit, in particular with at least three streams, which transfers heat simultaneously between different fluids that flows through the second heat exchange unit 22.

In contrast to two serially connected heat exchangers where coolant is first exchanging thermal energy with one fluid and then, downstream thereof, exchanging thermal energy to a second fluid, the multi-stream heat exchange unit provides a simultaneous exchange of thermal energy between the fluids. Although, the flow direction of the fluids inside the heat exchange unit can be counter-crossing and not in parallel, the principle itself for the heat exchange is according to a parallel principle, for example a side-by-side flow, in contrast to a serial principle. In a serial principle, one heat exchanger is placed after the other, so that the coolant first flows through a first heat exchanger, and then the same coolant flows through a second heat exchanger.

In the first heat exchange unit 21, the direction of the first coolant is opposite to the flow of the fuel and the air, which are colder than the first coolant. In the second heat exchange unit 22, the direction of the second coolant is opposite to the flow of the first coolant and the exhaust gas, which are warmer than the second coolant during normal operation.

Notice that the exemplified temperature of 175° C. of the first coolant at the coolant outlet of the fuel cell 15 is not much different from the temperature of 160° C. to 170° C. of the first coolant at the inlet to the fuel cell 15. This implies that only a relatively small amount of thermal energy has to be removed from the first coolant cycle 18. The consequence thereof is that the heat exchange units 21, 22 can be constructed relatively small. This is one reason why high temperature fuel cells are useful for compact systems, especially when used in automobiles.

In the current configuration, the first coolant in the first heat exchange unit 21 transfers heat to the methanol/water mix as fuel 20 for use in the reformers 8 in order to cause it to evaporate into a fuel gas so that the methanol/water fuel 20 can be supplied to the reformers 8 as a gas mix. The first coolant also transfers heat to the air 16 that is supplied into the cathode side 14. The heat transfer from the first coolant to the methanol/water fuel 20 and the air 16 ensures that the gases have a temperature high enough for efficient reaction.

The fact that the first heat exchange unit 15 works in a multi-stream flow principle makes adjustment of the correct temperatures for the fuel 20 and the air 16 more complex as compared to using two different and separate heat exchangers. However, by using temperature gauges, valves 35, 36, and flow meters controlled by a correspondingly programmed electronic controller, the flow can be readily adjusted and precisely controlled by a correspondingly programmed logical feedback control system during operation. However, the advantage of the first heat exchange unit 21 is a far more compact technical solution, requiring very little space in the fuel cell system of a vehicle.

As explained above, some of the heat from the fuel cell is removed in the first heat exchange unit 21. In order to remove heat in general from the system, a second heat exchange unit 22 is employed. This second heat exchange unit 22 transfers heat to a second cooling circuit 25. The second coolant circuit 25 removes thermal energy from the fuel cell 15 and is cooled in a cooler with a radiator 26, for example as it is normally known for vehicles in which an engine has to be cooled.

Figure 3:
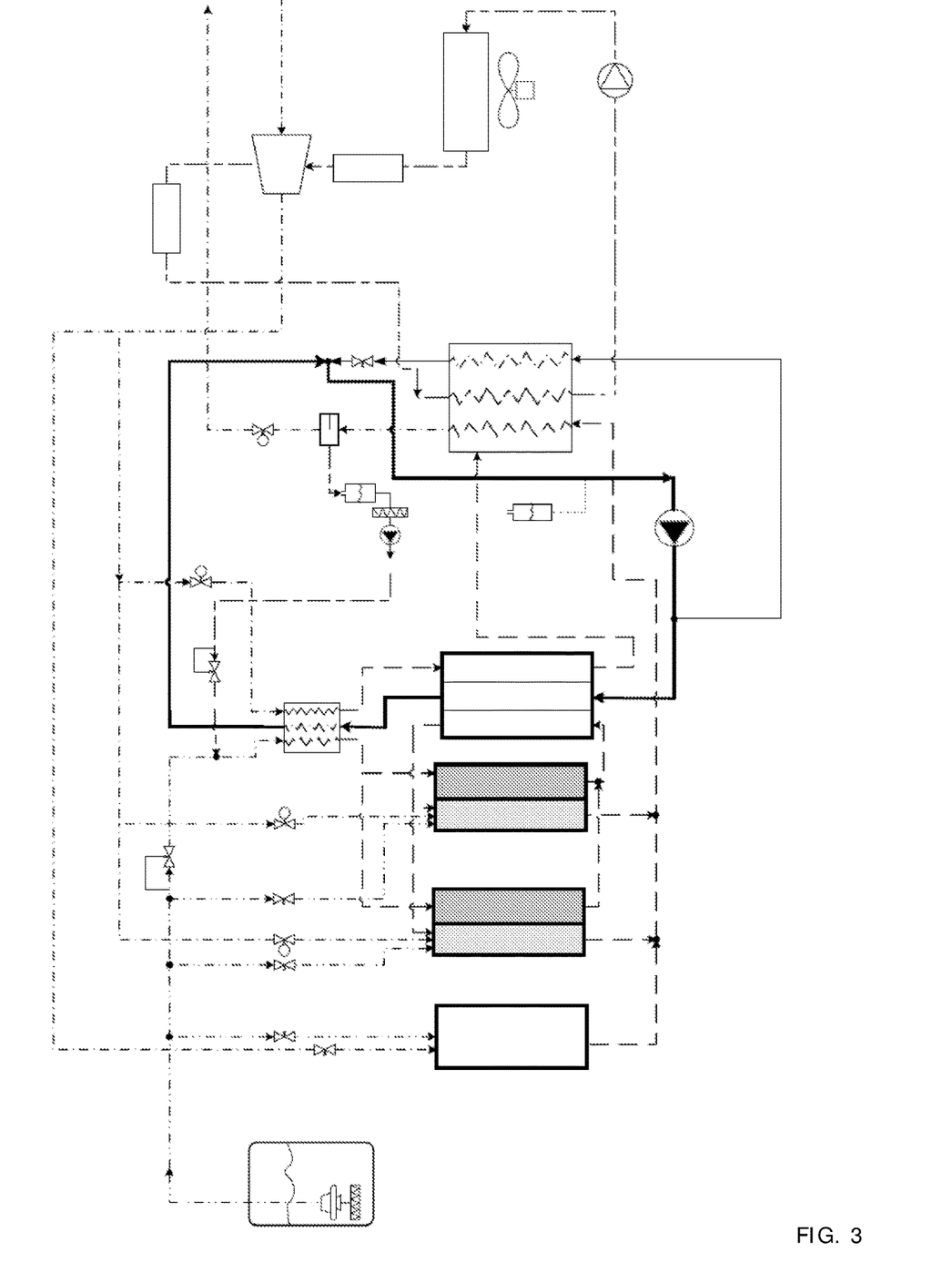
FIG. 3 illustrates the coolant flow in normal operation during power production.

FIG. 1, and as emphasized in FIG. 3, illustrates the flow in the first coolant circuit 18 during normal operation. The coolant flows from the fuel cell 15 through the first heat exchange unit 21 along coolant circuit branch 18A, passing branch point 39, then to the pump 38, and from there into the fuel cell 15 again. At branch point 40, a portion of the first coolant, for example not more than 50%, is diverted into a second branch 18B through valve 36 and into the second heat exchange unit 22 in order to transfer heat to the second cooling circuit 25.

As already discussed above for the exemplified temperatures for high temperature fuel cells, there is not much different from the inlet temperature of 160° C. to 170° C. and the outlet temperature of 175° C. This implies for the second branch 18B that only a minor portion of the first coolant, for example in the range of 5-50% or 5-30%, has to be diverted at branch point 40 and flow through the second branch 18B. Due to the fact that only a minor portion of the first coolant flow through branch 18B between branch points 40 and 39, as compared to the amount in the branch 18A, not only the second heat exchange unit 22 can be of relatively small size, but also the valve 36 and the tubing of branch 18B can be made small and compact. This is a great advantage for systems that require compact and light-weight solutions such as automobiles. This is one reason why high temperature fuel cells are useful for compact systems, especially when used in automobiles.

Potentially, the second heat exchange unit 22 is also a multi-stream heat exchange unit. One of the multiple streams through the second multi-stream heat exchange unit 22 is for the first coolant that also has one way through the first multi-stream heat exchange unit 21. In the second multi-stream heat exchange unit 22, the first coolant is reduced in temperature by heat exchange with a second cooling circuit 25. The second coolant cycle 25 is also taking up thermal energy from the exhaust gas 27 from the reformer burner 7 and from the fuel cell cathode side 14.

The exhaust gas contains water vapor, nitrogen gas, carbon dioxide, and oxygen gas. Due to the cooling in the second heat exchange unit 22, the water can be condensed in a liquid/gas separator 28. From the liquid gas separator 28, an amount of water is condensed in a water storage tank 29 for recycling for mixing with methanol 3 at the mixing point 10, while a remaining part of the steam and condensed water is discarded through the exhaust 30 together with the other gases.

The cooling of the water vapor is advantageous in that the water vapour is not leaving the exhaust 30 as hot steam at a temperature that could cause injury for people near the exhaust 30 pipe but rather leaves the system primarily as condensed water, dripping out of the exhaust pipe. This is a pronounced advantageous side effect of the system, in addition to its compactness.

For the air supply 16 to the cathode side 14 of the fuel cell 15, a compressor 31 is used, which is also cooled by the second coolant circuit 25. This second cooling circuit 25 is optionally also used for cooling further equipment, such as current converters 32 to ramp down the voltage from the fuel cell 15 stack and converters 33 that change direct current (DC) voltage to alternating current (AC) voltage for power supply to the compressor 31.

In order to ensure clean methanol and water supply, corresponding filters 34a, 34b are, respectively, applied in the methanol supply tank 3 and in the recycle connection for the water between the water separator 28 and the mixing point 10.

The fuel cell system 1 is optionally provided with only one of the two multi-stream heat exchange units 21, 22. Alternatively, further multi-stream heat exchange units are employed. The two shown multi-stream heat exchange units 21, 22 are examples of how these can be employed in different ways.

Figure 2:
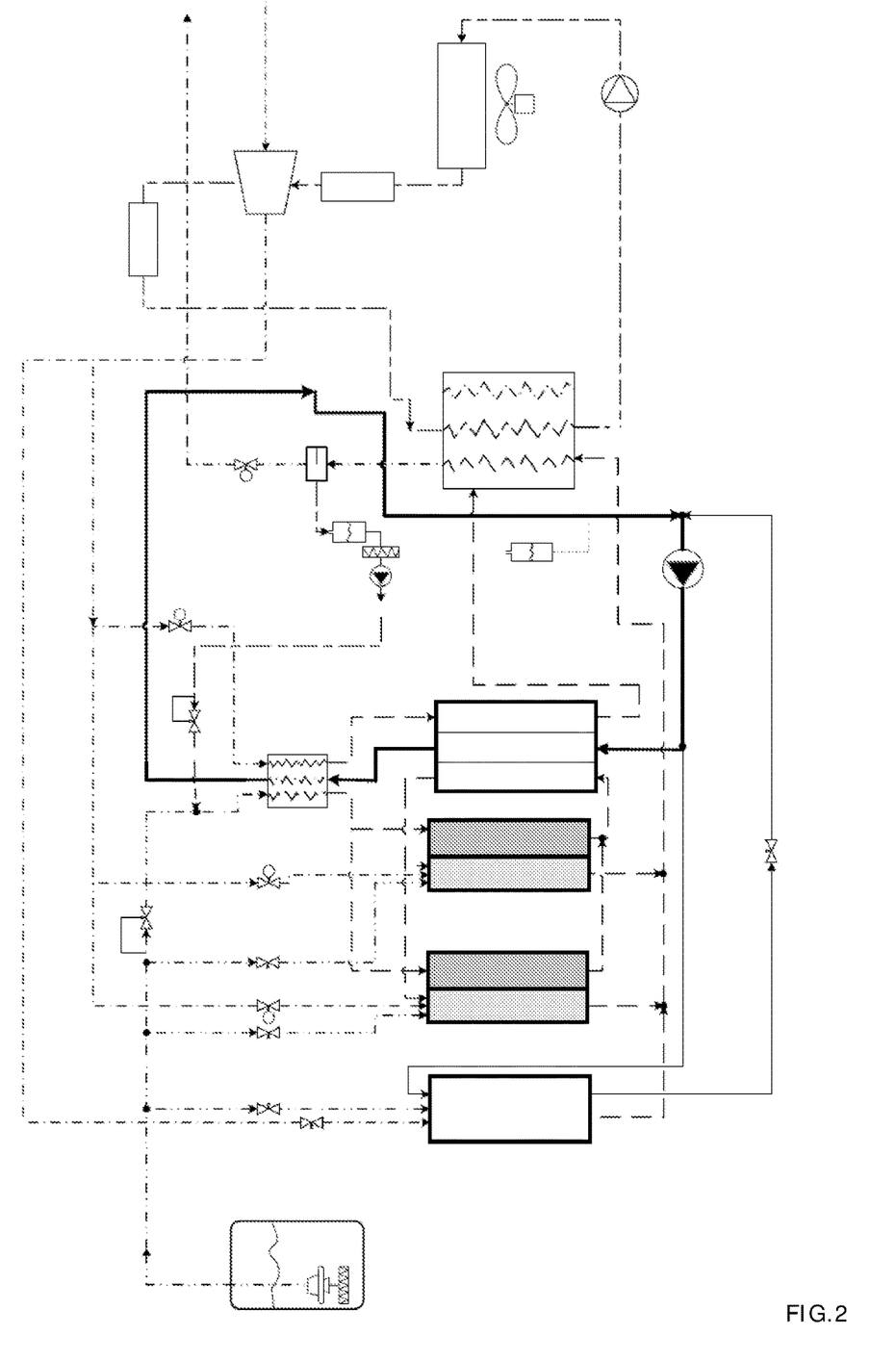
FIG. 2 illustrates the coolant flow in start-up situation.

In start-up situations, which is shown in FIG. 1 and emphasized in en example in FIG. 2, methanol and air are burned in start-up heater 5, which heats up the first coolant in a third branch 18C of the first cooling circuit 18. From this third branch 18C, the first coolant is then flowing from the startup heater 5 through the fuel cell 15 in order to heat the fuel cell up to operation temperature.

Downstream of the fuel cell 15, the first coolant, which in start-up situations is a heating fluid, flows also through the first multi-stream heat exchange unit 21 in order to heat the incoming air 16 and cause evaporation of the methanol/water mix fuel 20. Once, operation temperature of the fuel cell 15 has been reached, the coolant flow is adjusted to the normal operation in the first cooling circuit 18, for temperature control of the fuel cell, as illustrated in FIG. 3.

The amount of first coolant through the startup heater 5 is adjusted to the amount needed to achieve a sufficiently high temperature. This is adjusted with an adjustment valve 35. The transition between start-up flow for the coolant and the flow for normal operation is done by interplay between the adjustment valve 35 in the start-up branch 18C for the coolant and the adjustment valve 36 for the coolant in the normal operation branch 18B when in normal operation conditions. The normal operation branch 18B is emphasized in FIG. 3.

Typically, during normal operation, the startup heater 5 is not working, and the flow in the third branch 18C closed by closure of valve 35. In turn, valve 36 is open during normal operation but closed during startup or at least in the initial phase of the startup.

During the start-up heating, the resulting gas 37 from the startup heater 5, which includes water, carbon dioxide and nitrogen gas, is also fed through the second heat exchange unit 22 in order to reduce the temperature before being led out of the exhaust 30 pipe without the risk for injury of persons. Possible water separation by the water separator 28 already in this startup stage ensures that there is a water supply for the methanol water mix as fuel 20 for reformer 8 and the fuel cell 15.

The fact that water is recycled and also produced during start-up adds to the compactness of the system in that no large water storage tank 29 is needed. It is also important to notice that reduced or possibly even avoided storage of water is an advantage in that problems with freezing water in the system at very low environmental temperatures are avoided.

In FIG. 1, a number of other components are illustrated, such as temperature gauges, pressure gauges and additional valves, which however are not explained in detail herein. These are optional components and add to proper functioning of the system but not strictly necessary as in the specifically shown configuration, as modifications of the configuration are also possible.

One example of a multi-stream heat exchange units is illustrated in FIG. 4. The multi-stream heat exchange unit in FIG. 4 is of the type in which the coolant flows in a space 50' of a middle section 50 that is sandwiched between two heat exchange modules 65, 66. The heat is transferred from the first coolant in the middle section through walls 51, 52 that delimit the space 50' in the middle section 50 against the heat exchange modules 65, 66. This multi-stream heat exchange unit has a three-layer configuration. In the following, it will be exemplified as the first heat exchange unit 21 that has been described above.

Figure 4A:
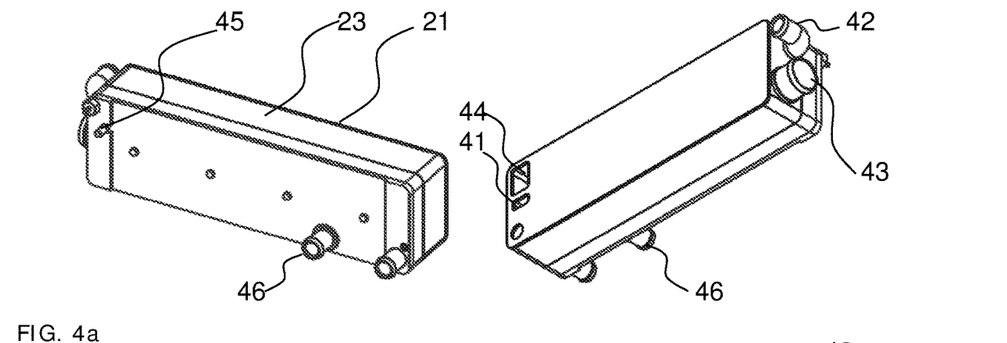
FIG. 4a shows two different perspective views.
Figure 4B:
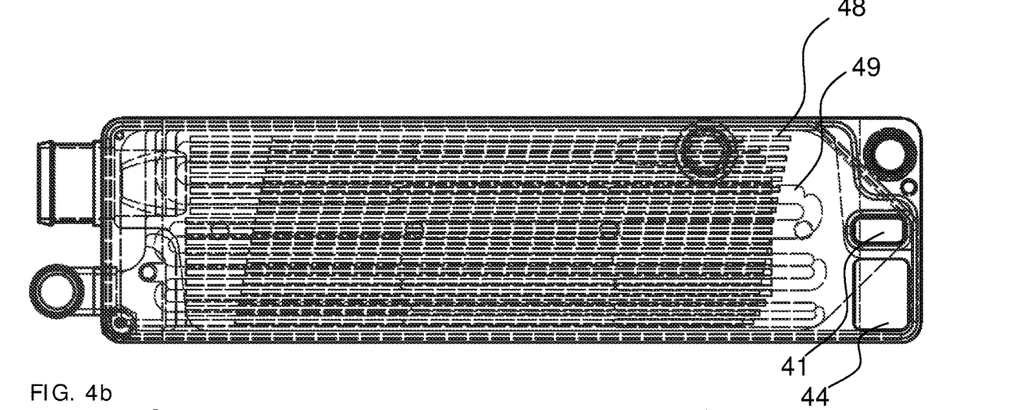
FIG. 4b illustrates a semi-transparent, partially cut-away view, and FIG. 4c a side view inside the unit.
Figure 4C:
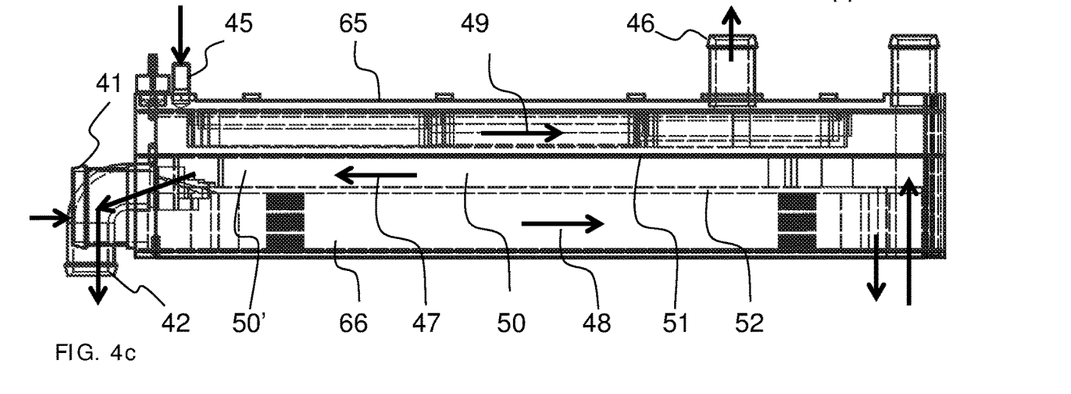
Figure 5A:
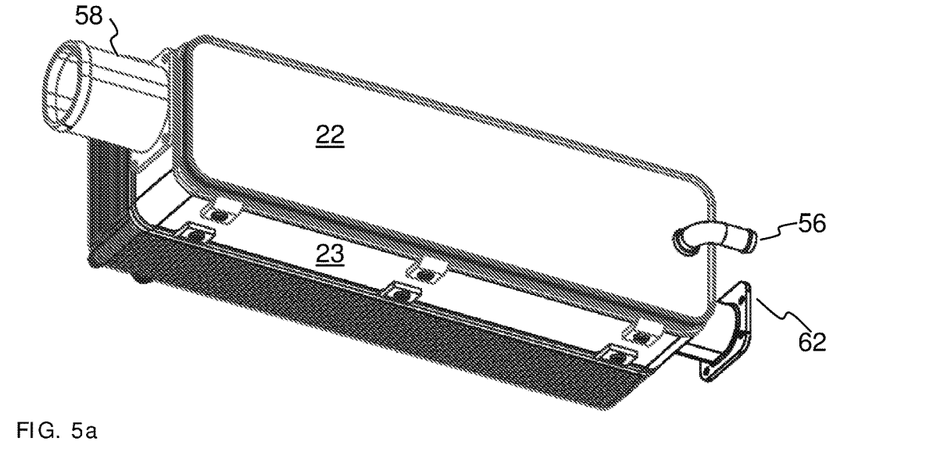
FIG. 5a is a perspective view.
Figure 5B:
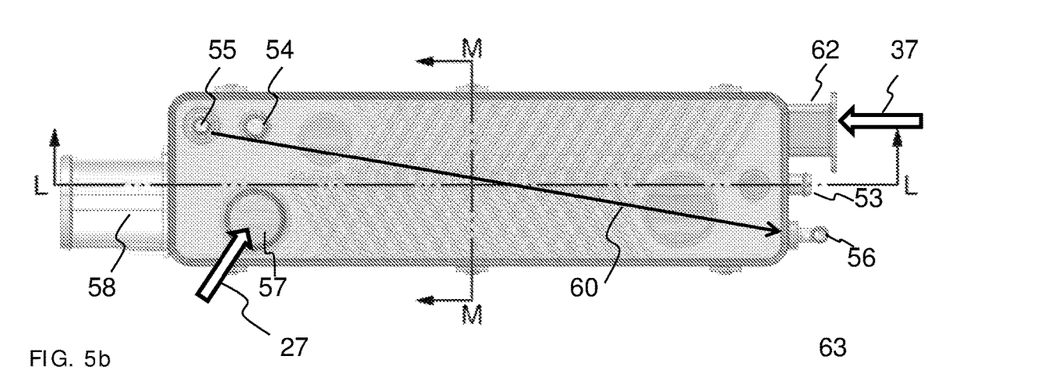
FIG. 5b is a semi-transparent view, FIG. 5c a partial cut-away view into the unit.
Figure 5C:
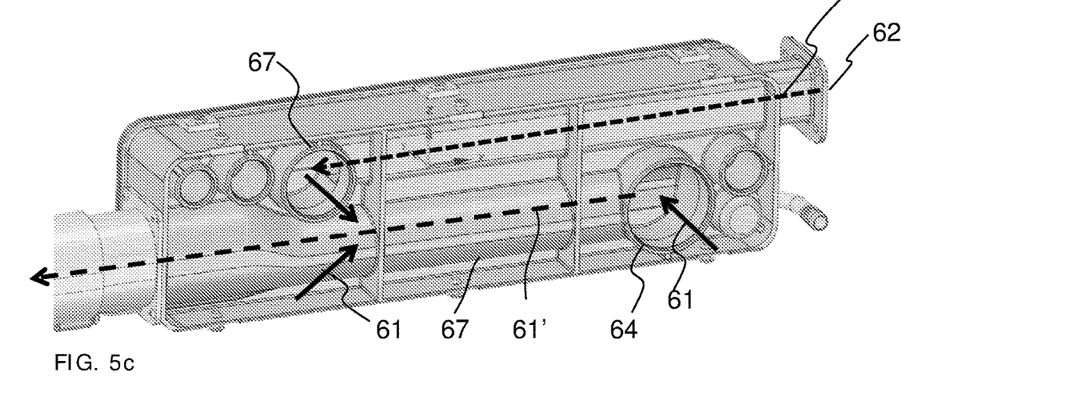
Figure 5D:
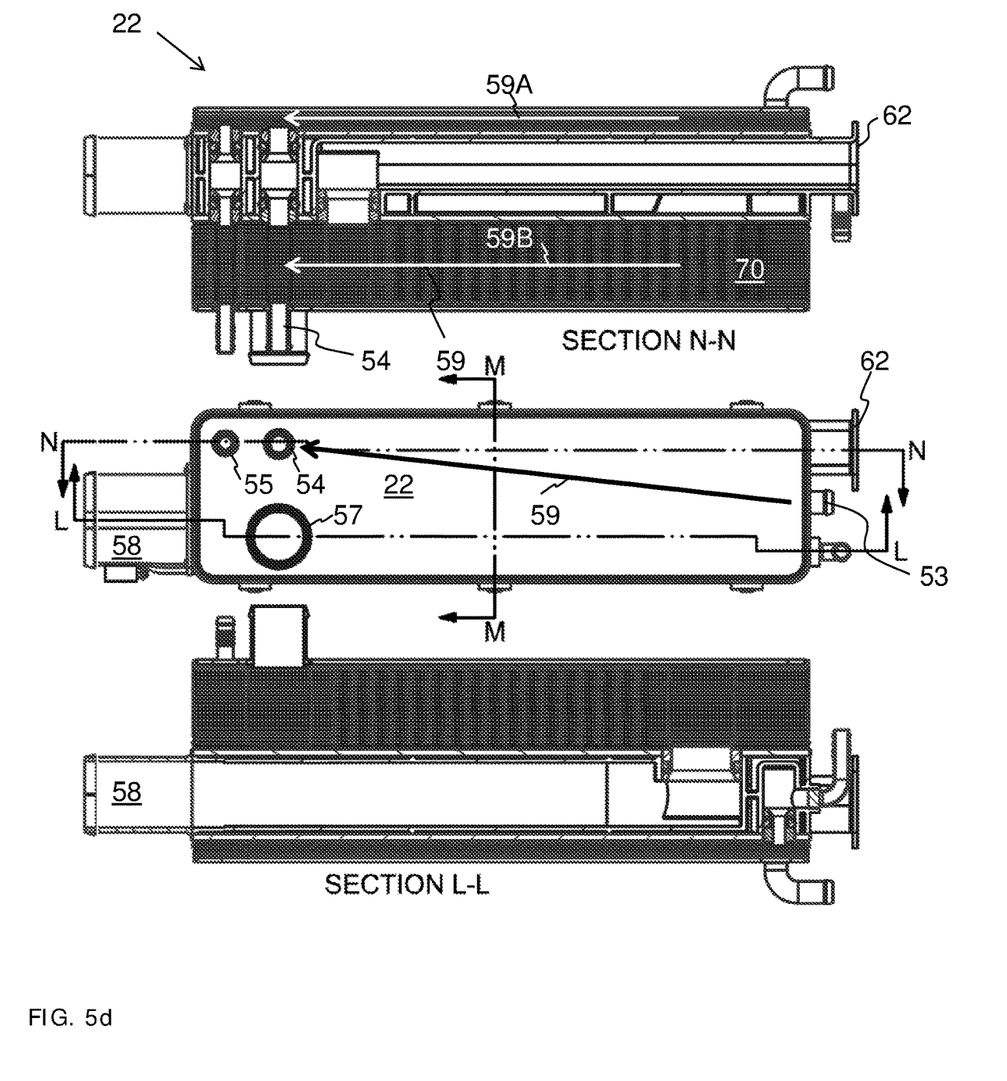
FIG. 5d illustrates a top with two sectional views.

An example of a principle for the first heat exchange unit 21 is illustrated in FIG. 4, wherein FIG. 4a shows two different perspective views, FIG. 4b illustrates a semi-transparent, partially cut-away view, and FIG. 4c a side view inside the first multi-stream heat exchange unit 21.

The first heat exchange unit 21 comprises a housing 23 and a first inlet 41 and a first outlet 42 for first coolant, and a first flow path 47 there in between for flow of the first coolant from the first inlet 41 through the first flow path 47 to the first outlet 42. The first heat exchange unit 21 comprises a second inlet 43 and a second outlet 44 for cathode gas, for example air, to provide oxygen gas to the fuel cell. A second flow path 48 is provided between the second inlet 43 and second outlet 44 for the cathode gas to flow from the second inlet 43 through the second flow path 48 to the second outlet 44. The first heat exchange unit 21 comprises a third inlet 45 and a third outlet 46 for providing fuel 20 to the fuel cell 15. A third flow path 49 is provided between the third inlet 45 and third outlet 46 for the fuel 20 to flow from the third inlet 45 through the third flow path 49 to the third outlet 46.

In the example of a multi-stream heat exchange unit in FIG. 4, and best seen in FIG. 4c, the first flow path 47 of the first coolant is in a middle section 50 between a first wall 51 and a second wall 52, where the first wall 51 is provided between the middle section 50 and the first heat exchange module 65, and the second wall 52 is provided between the middle section 50 and the second heat exchange module 66. As the walls are made of metal, for example aluminum, a proper heat transfer is provided from the first coolant to the cathode gas and to the fuel in the oppositely provided heat exchange modules 65, 66.

The second flow path 48 for the cathode gas, for example air, is between multiple corrugated plates in order to provide a large metal surface that transfers heat to the cathode gas. The corrugated plates also create turbulence, which is another advantage.

The third flow path 49 for the fuel 20 is meander-shaped for a better heat transfer as compared to a single straight path along the first wall 51. The tube for the third flow path 49 is increasing in diameter along the flow path 49, which is advantageous because the fuel 20 increases in volume during evaporation.

FIG. 5 illustrates a different principle of a multi-steam heat exchange unit in which the coolant is diverted into two opposite parts of the heat exchange unit, for example into two opposite heat exchange modules. This implies that a first part of the coolant is flowing into one section of the heat exchange unit, or at least predominantly, exchanging energy with fluid in that section of the heat exchange unit, while a second part of the coolant is flowing into another section of the heat exchange unit and only, or at least predominantly, exchanging energy with fluid in that section. In the following, it will be exemplified as the second heat exchange unit 22 that has been described above, with a third and fourth heat exchange module. However, the principle could also be applied for the first heat exchange unit 21.

The second heat exchange unit 22 comprises a fourth inlet 53 and a fourth outlet 54 for flow of the second coolant from the fourth inlet 53 through the second heat exchange unit 22 and to the fourth outlet 54. It also comprises a fifth inlet 55 and fifth outlet 56 for flow of the first coolant through the second heat exchange unit 22. It comprises a sixth inlet 57 and a sixth outlet 58 for flow of exhaust gas through the second heat exchange unit 22. It further comprises a seventh inlet 61 for inlet of reformer gas.

When comparing with FIG. 1, both exhaust gas 27 from the fuel cell 15 and burner reformer gas 37 as well as gas from the startup heater 5 flow through corresponding tubes to the second heat exchange unit 22. As mentioned before, these two gases 27, 37 can be combined prior to leading the gases 27, 37 into the second heat exchange unit 22. However, in the exemplified second heat exchange unit 22 of FIG. 5, the two gases 27, 37 are combined inside the second heat exchange unit 22. The exhaust gas 27 from the fuel cell 15 enters sixth inlet 57, and the reformer burner gas 37 enters the seventh inlet 62. The sixth flow path 61 for the exhaust gas 27 is from the sixth inlet 57 into the second heat exchange unit 22 and towards opening 64. The seventh flow 63 path for the reformer burner gas 37 it through the seventh inlet 62, then to a further opening 68 after which the reformer burner gas 37 mixes with the exhaust gas 27, which also flows to opening 64, from which the flow path 61' is a combined sixth and seventh flow through opening 64 and then into tube 67 towards sixth outlet 58.

The second coolant flows into the second heat exchange unit 22 through the fourth inlet 53 along the fourth flow path 59 and out of the second heat exchange unit 22 through the fourth outlet. Notice that the second coolant is diverted into two flow paths 59A, 59B, one for heat exchange with the first coolant in one section of the second heat exchange unit 22 and one for heat exchange with the mix of exhaust gas 27 and reformer burner gas 37 in another section of the second heat exchange unit 22. For efficient heat exchange, two sets 69A, 69B of a plurality of corrugated sheets 70 are provided.

REFERENCE NUMBERS 1 fuel cell system
2 methanol supply tank
3 methanol
4 tubes
4a methanol supply tube to startup heater 5
4b, 4c methanol supply tube to reformer burners 7
4d methanol supply tube to evaporator in heat exchange unit 21
5 startup heater
6 valve
7 reformer burners
8 reformers
9 water
10 mixing point for water and methanol
11 syngas
12 anode side
13 path for first coolant through fuel cell 15
14 cathode side
15 fuel cell
16 air
17 environment
18 first cooling circuit
18A first branch of first cooling circuit 18
18B second branch of first cooling circuit 18
18C third branch of first cooling circuit 18
19 coolant inlet of fuel cell 15
20 fuel, ex. methanol/water mix
21 first heat exchange unit
22 second heat exchange unit
23 housing
25 second cooling circuit
26 radiator
27 exhaust gas from fuel cell
28 liquid/gas separator
29 water storage tank/reservoir
30 exhaust
31 compressor
32 voltage converters
33 DC/AC converters
34a methanol filter
34b water filter
35 valve in branch 18C
36 valve in branch 18B
37 gas from startup heater 5 and from reformer burner 7
38 pump
39 branch point between branches 18A and 18B downstream of second heat exchange unit 22
40 branch point between 18A and 18B upstream of second heat exchange unit 22
41 first inlet of first heat exchange unit 21 for first coolant
42 first outlet of first heat exchange unit 21 for first coolant
43 second inlet of first heat exchange unit 21 for cathode gas, ex. air
44 second outlet of first heat exchange unit 21 for cathode gas, ex. air
45 third inlet of first heat exchange unit 21 for fuel
46 third outlet of first heat exchange unit 21 for fuel
47 first flow path for first coolant
48 second flow path for air
49 meander-formed third flow path for fuel
50 space forming a middle section with coolant flow
51 wall between middle section and evaporator
52 wall between middle section and air heater
53 fourth inlet of second heat exchange unit 22 for second coolant
54 fourth outlet of second heat exchange unit 22 for second coolant
55 fifth inlet of second heat exchange unit 22 for first coolant
56 fifth outlet of second heat exchange unit 22 for first coolant
57 sixth inlet of second heat exchange unit 22 for exhaust gas
58 sixth outlet of second heat exchange unit 22 for exhaust gas
59 fourth flow path for second coolant
60 fifth flow path for first coolant
61 sixth flow path for exhaust gas
61' combined sixth 61 and seventh flow path 63 for mix of exhaust and reformer gas
62 seventh inlet for reformer gas
63 seventh flow path for reformer gas
64 opening for sixth and seventh flow path
65 first heat exchange module in first heat exchange unit 21
66 second heat exchange module in first heat exchange unit 21
67 tube between opening 64 and sixth outlet 58
68 further opening for seventh flow path 63

The invention claimed is:

1. A fuel cell system, comprising:
a fuel cell comprising an anode side and a cathode side and a proton exchange membrane therein between for transport of hydrogen ions from the anode side to the cathode side through the membrane during operation;
a cathode gas supply, for example air supply, for supplying oxygen gas to the cathode side, the cathode gas comprising oxygen gas,
a cathode gas heating system, for example an air heating system, for increasing the temperature of the oxygen gas prior to supplying the cathode gas to the cathode side;

a first cooling circuit for circulating first coolant through the fuel cell for adjusting the temperature of the fuel cell with the first coolant;

a reformer comprising a catalyser enclosed by reformer walls and configured for catalytic conversion of fuel to syngas, wherein the reformer is conduit-connected to the anode side of the fuel cell for provision of syngas to the fuel cell;

an evaporator configured for evaporating liquid fuel and conduit-connected to the reformer for provision of the evaporated fuel to the reformer;

a liquid fuel supply conduit-connected to the evaporator for providing liquid fuel to the evaporator;

a reformer burner for heating the catalyser inside the reformer by heat transfer through the reformer walls;

characterised in that the fuel cell system comprises a first heat exchange unit or a second heat exchange unit or both, wherein the first heat exchange unit is provided as a first single unit with a first housing and comprising at least three flow paths inside the first heat exchange unit for simultaneous exchange of thermal energy between the fluids in the three flow paths, the three flow paths comprising a first flow path, a second and a third flow path through the first heat exchange unit, wherein the first flow path is for the first coolant and part of the first cooling circuit, wherein the second flow path is for the cathode gas, for example air, and constitutes the cathode gas heating system, for example air heating system, and the third flow path is for flow of the fuel and constitutes the evaporator, wherein the first flow path is in thermal connection with the second and the third flow paths for simultaneous transfer of thermal energy from the first coolant inside the housing to the cathode gas for heating the cathode gas and from the first coolant to the fuel for evaporating the fuel during their flow through the first heat exchange unit when the fuel cell system is in power producing operation;

wherein the second heat exchange unit is provided as a second single unit with a second housing and comprising at least three flow paths inside the second heat exchange unit, the three flow paths comprising a fourth, a fifth and a sixth flow path through the second heat exchanger, wherein the fourth flow path is for a second coolant different from the first coolant and part of a second cooling circuit, different and flow-separated from the first cooling circuit; wherein the fifth flow path is for the first coolant and part of the first cooling circuit, and the sixth flow path is for at least one of: exhaust gas from the cathode side and flue gas from the reformer burner; wherein the fourth flow path is in thermal connection with the fifth and the sixth flow paths for simultaneous transfer of thermal energy from the first coolant inside the housing to the second coolant for reducing the temperature of the first coolant, and from the exhaust gas to the second coolant for condensing the water of the exhaust gas in the sixth flow path prior to leaving the fuel cell system through an exhaust when the fuel cell system is in power producing operation.

2. The fuel cell system according to claim 1, wherein the first heat exchange unit comprises:

a first inlet conduit-connected to the first coolant circuit at a downstream side of the fuel cell for receiving the first coolant from the fuel cell after the first coolant has traversed the fuel cell;

a first outlet for outlet for the first coolant after heat transfer from the first cool ant to the cathode gas and the fuel;

a second inlet conduit-connected to the cathode gas supply, for example air supply, for receiving oxygen gas for the cathode side of the fuel cell;

a second outlet conduit-connected to the cathode side of the fuel cell for providing heated cathode gas to the fuel cell;

a third inlet conduit-connected to the fuel supply for receiving fuel, for example a methanol/water mix;

a third outlet conduit-connected to the anode side of the fuel cell for supplying evaporated fuel to the anode side of the fuel cell;

wherein the first flow path is between the first inlet and the first outlet and flow-connected with the first inlet and the first outlet, the second flow path is between the second inlet and the second outlet and flow-connected with the second inlet and the second outlet, and the third flow path is between the third inlet and the third outlet and flow-connected with the third inlet and the third outlet.

3. The fuel cell system according to claim 1, wherein the second heat exchange unit comprises:

a fourth inlet conduit-connected to a second coolant circuit for inflow of second coolant from the second cooling circuit, and a fourth outlet for outflow of the second coolant to the second cooling circuit;

a fifth inlet and a fifth outlet conduit-connected to the first coolant circuit for flow of the first coolant through the second heat exchange unit;

a sixth inlet conduit-connected to a downstream from the cathode side of the fuel cell for receiving exhaust gas from the cathode side and/or conduit-connected to the reformer burner for receiving flue gas from the reformer burner;

a sixth outlet for releasing received exhaust gas and/or flue gas;

wherein the fourth flow path is between the fourth inlet and the fourth outlet and flow-connected with the fourth inlet and the fourth outlet, the fifth flow path is between the fifth inlet end the fifth outlet and flow-connected with the fifth inlet and the fifth outlet, and the sixth flow path is between the sixth inlet and the sixth outlet and flow-connected with the sixth inlet and the sixth outlet.

4. The fuel cell system according to claim 1, wherein the first, second and third paths of the first heat exchange unit are separated by thermal conducting first and second metal walls, wherein the first flow path is sandwiched between the second and the third flow paths, and configured for exchanging thermal energy between the first flow path and the second flow path only through the first metal wall and exchanging thermal energy between the first flow path and third flow path only through the second metal wall.

5. The fuel cell system according to claim 1, wherein second heat exchange unit is configured for diverting part of the second coolant into a first portion of the second coolant for only or predominantly exchanging energy with the first coolant in the fifth flow path and a second portion of the second coolant for only or pre dominantly exchanging energy with the exhaust gas in the sixth flow path.

6. The fuel cell system according to claim 1, wherein the fuel cell system comprises a water separator fluid-flow connected to the sixth flow path between the second heat exchange unit and the exhaust, wherein the water separator is configured for separating at least part of the condensed water from the exhaust gas flowing from the sixth flow path towards the exhaust.

7. The fuel cell system according to claim 6, wherein the fuel cell system comprises the first as well as the second heat exchange units, wherein the water separator is part of a water recycling system for providing water to alcohol prior to evaporation of the mix of alcohol and water as fuel in the third flow path.

8. The fuel cell system according to claim 1, wherein the fuel cell system comprises a startup heater for heating the fuel cell system during startup conditions prior to normal power producing fuel cell operation, wherein the first cooling circuit comprises a branch for flow of the first coolant through the startup heater in startup conditions, wherein the branch is open for flow of the first coolant through the branch in startup conditions for flow of the first coolant from the startup heater through the fuel cell and through the first heat exchange unit for heating the fuel cell, the cathode gas, and the fuel.

9. The fuel cell system according to claim 8, wherein the fuel cell system is configured for closing for flow of the first coolant in the branch during steady state power producing operation of the fuel cell.

10. The fuel cell system according to claim 1, wherein the fuel cell is a high temperature polymer electrolyte membrane HT-PEM fuel cell, configured for operating at a temperature in the range of 120-200° C.

11. A method of operating a fuel cell system, the fuel cell system comprising:
   a fuel cell comprising an anode side and a cathode side and a proton exchange membrane therein between for transport of hydrogen ions from the anode side to the cathode side through the membrane during operation;
   a cathode gas supply, for example air supply, for supplying oxygen gas to the cathode side, the cathode gas comprising oxygen gas,
   a cathode gas heating system, for example an air heating system, for increasing the temperature of the oxygen gas prior to supplying the cathode gas to the cathode side;
   a first cooling circuit for circulating first coolant through the fuel cell for adjusting the temperature of the fuel cell with the first coolant;
   a reformer comprising a catalyser enclosed by reformer walls and configured for catalytic conversion of fuel to syngas, wherein the reformer is conduit-connected to the anode side of the fuel cell for provision of syngas to the fuel cell;
   an evaporator configured for evaporating liquid fuel and conduit-connected to the reformer for provision of the evaporated fuel to the reformer;
   a liquid fuel supply conduit-connected to the evaporator for providing liquid fuel to the evaporator;
   a reformer burner for heating the catalyser inside the reformer by heat transfer through the reformer walls;
   characterised in that the fuel cell system comprises a first heat exchange unit or a second heat exchange unit or both,
   wherein the first heat exchange unit is a first multi-stream heat exchange module and provided as a first single unit with a first housing and comprising at least three flow paths for simultaneous exchange of thermal energy between the fluids in the three flow paths, the three flow paths comprising a first flow path, a second and a third flow path through the first heat exchange unit, wherein the first flow path is for the first coolant and part of the first cooling circuit, wherein the second flow path is for the cathode gas, for example air, and constitutes the cathode gas heating system, for example air heating system, and the third path is for flow of the fuel and constitutes the evaporator, wherein the first flow path is in thermal connection with the second and the third flow paths for simultaneous transfer of thermal energy from the first coolant inside the housing to the cathode gas for heating the cathode gas and from the first cool ant to the fuel for evaporating the fuel during its flow through the first heat exchange unit when the fuel cell system is in power producing operation;
   wherein the second heat exchange unit is a second multi-stream heat exchange unit and provided as a second single unit with a second housing and comprising at least three flow paths, the three flow paths comprising a fourth, a fifth and a sixth flow path through the second heat exchanger unit, wherein the fourth flow path is for a second coolant different from the first cool ant and part of a second cooling circuit, different and flow-separated from the first cooling circuit; wherein the fifth flow path is for the first coolant and part of the first cooling circuit, and the sixth flow path is for at least one of: the exhaust gas from the cathode side and the flue gas from the reformer burner; wherein the fourth flow path is in thermal connection with the fifth and the sixth flow paths for simultaneous transfer of thermal energy from the first coolant inside the housing to the second coolant for reducing the temperature of the first coolant, and from the exhaust gas to the second coolant for condensing the water of the exhaust gas in the sixth flow path prior to leaving the fuel cell system through an exhaust when the fuel cell system is in power producing operation;
   wherein the method comprises during power producing operation of the fuel cell system at least one of:
   providing flow of the first coolant through the first flow path, flow of the cathode gas through the second flow path, and flow of the fuel through the third flow path, and causing simultaneous transfer of thermal energy from the first coolant to the cathode gas for heating the cathode gas and to the fuel and evaporating the fuel during flow through the first heat exchange unit when the fuel cell system is in power producing operation; and
   providing flow of the second coolant through the fourth flow path, flow of the first coolant through the fifth flow path, flow through the sixth flow path of at least one of: the exhaust gas from the cathode side and the flue gas from the reformer burner; and causing simultaneous transfer of thermal energy from the first coolant to the second coolant for reducing the temperature of the first coolant, and from the exhaust gas to the second coolant for condensing the water of the exhaust gas when the fuel cell system is in power producing operation.

12. A method according to claim 11, wherein the first heat exchange unit comprises:
   a first inlet conduit-connected to the first coolant circuit at a downstream side of the fuel cell for receiving the first coolant from the fuel cell after the first coolant has traversed the fuel cell;
   a first outlet for outlet for the first coolant after heat transfer from the first cool ant to the cathode gas and the fuel;
   a second inlet conduit-connected to the cathode gas supply, for example air supply, for receiving oxygen gas for the cathode side of the fuel cell;

a second outlet conduit-connected to the cathode side of the fuel cell for providing heated cathode gas to the fuel cell;

a third inlet conduit-connected to the fuel supply for receiving fuel, for example a methanol/water mix;

a third outlet conduit-connected to the anode side of the fuel cell for supplying evaporated fuel to the anode side of the fuel cell;

wherein the method comprises:

receiving first coolant through the first inlet from a downstream side of the fuel cell after the first coolant has traversed the fuel cell;

receiving cathode gas through the second inlet from the cathode gas supply, for example air supply, and transferring thermal energy from the first coolant to the cathode gas, and then releasing the cathode gas through the second outlet for providing heated cathode gas to the fuel cell;

receiving fuel through the third inlet from the fuel supply and transferring thermal energy to the fuel and then releasing evaporated fuel through the third outlet for supplying the evaporated fuel to the anode side of the fuel cell.

13. The method according to claim 11, wherein at least one of:

the three flow paths of the first heat exchange unit are separated by a thermal conducting first and second metal walls, wherein the first flow path is sandwiched between the second and the third flow paths and the method comprises exchanging thermal energy between the first coolant and the cathode gas only through the first metal wall and exchanging thermal energy between the first coolant and the fuel only through the second metal wall;

at least a part of the inflow of second coolant through the fourth flow path is diverted into a first and second portion of the second coolant, where the first portion of the second coolant is only or predominantly exchanging energy with the first cool ant in the fifth flow path, and the second portion of the second coolant is only or predominantly exchanging energy with the exhaust gas in the sixth flow path.

14. The method according to claim 11, wherein the fuel cell is a high temperature polymer electrolyte membrane HT-PEM fuel cell, and wherein the method comprises operating the fuel cell at a temperature in the range of 120-200° C.

15. The method according to claim 11, wherein the method comprises diverting only a portion of the first coolant through the second heat exchange unit during normal power producing operation of the fuel cell in order to transfer heat to the second cooling circuit from only that portion, wherein the diverted portion is less than 50% of the total flow of first coolant through the first cooling circuit.

16. The method according to claim 11, wherein the method comprises providing the fuel as a mix of alcohol and water.

* * * * *